(12) United States Patent
Trehan (10) Patent No.: US 11,741,317 B2
(45) Date of Patent: Aug. 29, 2023

(54) METHOD AND SYSTEM FOR PROCESSING MULTILINGUAL USER INPUTS USING SINGLE NATURAL LANGUAGE PROCESSING MODEL

(71) Applicant: Rajiv Trehan, Bangkok (TH)

(72) Inventor: Rajiv Trehan, Bangkok (TH)

(73) Assignee: Rajiv Trehan, Bangkok (TH)

( * ) Notice: Subject to any disclaimer, the term of this patent is extended or adjusted under 35 U.S.C. 154(b) by 97 days.

(21) Appl. No.: 17/329,383

(22) Filed: May 25, 2021

(65) Prior Publication Data

US 2021/0365642 A1    Nov. 25, 2021

Related U.S. Application Data

(60) Provisional application No. 63/029,704, filed on May 25, 2020.

(51) Int. Cl.
| | |
|---|---|
| *G10L 15/00* | (2013.01) |
| *G06F 40/51* | (2020.01) |
| *G10L 15/26* | (2006.01) |
| *G06F 40/35* | (2020.01) |
| *G06F 40/47* | (2020.01) |

(52) U.S. Cl.
CPC .............. *G06F 40/51* (2020.01); *G06F 40/35* (2020.01); *G06F 40/47* (2020.01); *G10L 15/26* (2013.01)

(58) Field of Classification Search
CPC .......... G06F 40/51; G06F 40/35; G06F 40/47; G06F 40/40; G10L 15/26; G10L 15/22; G10L 15/00
See application file for complete search history.

(56) References Cited

U.S. PATENT DOCUMENTS

| | | | |
|---|---|---|---|
| 9,881,007 B2 * | 1/2018 | Orsini | G06Q 30/0217 |
| 2011/0202334 A1 * | 8/2011 | Abir | G06F 40/55 |
| | | | 704/4 |
| 2014/0180670 A1 * | 6/2014 | Osipova | G06V 20/20 |
| | | | 704/3 |
| 2019/0095430 A1 * | 3/2019 | Smus | G06F 40/58 |

\* cited by examiner

*Primary Examiner* — Paras D Shah
*Assistant Examiner* — Uthej Kunamneni
(74) *Attorney, Agent, or Firm* — Kendal Sheets (57) ABSTRACT

The disclosure relates to system and method for processing multilingual user inputs using a Single Natural Language Processing (SNLP) model. The method includes receiving a user input in a source language and translating the user input to generate a plurality of translated user inputs in an intermediate language. The method includes using the SNLP model configured only using the intermediate language to generate a plurality of sets of intermediate input vectors in the intermediate language. The method includes processing the plurality of sets of intermediate input vectors in the intermediate language using at least one of a plurality of predefined mechanisms to identify a predetermined response. The method includes translating the predetermined response to generate a translated response that is rendered to the user.

17 Claims, 6 Drawing Sheets

| 204 | 206 |
|---|---|
| {"query": "この料理が美味しいですよ", "confidence": 0.854158580303192l, "language_code": "ja-JP"} | {"query": "This dish is delicious", "confidence": 0.854158580303192l, "language_code": "en-EN"} |
| {"query": "この料理がおいしいでしょ", "confidence": 0.858399629592895, "language_code": "ja-JP"} | {"query": "This dish is delicious", "confidence": 0.858399629592895, "language_code": "en-EN"} |
| {"query": "この料理が美味しいでしょ", "confidence": 0.867255270481l096, "language_code": "ja-JP"} | {"query": "This dish is delicious, isn't it?", "confidence": 0.858399629592895, "language_code": "en-EN"} |
| {"query": "小料理が美味しいで すが", "confidence": 0.833282947540283l, "language_code": "ja-JP"} | {"query": "Small dishes are delicious", "confidence": 0.858399629592895, "language_code": "en-EN"} |

METHOD AND SYSTEM FOR PROCESSING MULTILINGUAL USER INPUTS USING SINGLE NATURAL LANGUAGE PROCESSING MODEL

CROSS-REFERENCE TO RELATED APPLICATION

This application claims priority benefits under 35 U.S.C. § 119(e) to U.S. Provisional Application No. 63/029,704 filed on May 25, 2020, which is hereby incorporated by reference in its entirety.

TECHNICAL FIELD

This disclosure relates generally to gathering information from user inputs in multiple languages and subsequently processing it, and more particularly to system and method for processing the multilingual user inputs using Single Natural Language Processing (SNLP) model.

BACKGROUND

A chatbot is a computer program that simulates and provides an interface for a conversation with a user. The chatbot may be configured to perform various tasks in response to a user input provided during a conversation. The user input may be provided in various forms including, for example, as audio input and text input. Thus, Natural Language Understanding (NLU), speech-to-text, and other linguistic processing techniques may be employed as part of processing performed by the chatbot.

Additionally, functioning of the chatbot may be programmed using a Rule based approach, a Machine learning (ML) approach and an Artificial Intelligence (AI) powered approach. The Rule based approach enables the chatbot to provide answers to specific questions based on pre-defined rules. This approach may enable the user to traverse through a network of questions and their corresponding answers to find a known data source. The ML approach enables the chatbot to learn responses and probable intents from a corpus of training data. Once the intent is understood, the chatbot may respond by providing information from known data sources. The AI powered approach enables the chatbot to use various mechanisms of a Natural Language Processing (NLP) model, a ML model and an AI model to understand the user input.

Each of these approaches use an NLP model to determine a user intent from the user input. Further, three broad approaches are available for processing a natural language input, namely a statistical approach, a grammatical approach, and a machine learning approach. Each of these approaches have various limitations. The statistical approach requires large example data sets that are representative of a statistical match that involves matching a text to a known text, a statistical determination of closeness which may be language dependent. The grammatical approach may require using well-defined and processable grammars for each language being considered as per the user input. These grammars may then be required to be mapped to an understanding of user intents in various languages. As the grammar for each of the language differs widely, this may require a parallel grammar based NLP mechanism to be managed for each language. Furthermore, the machine learning approach may require maintaining large training sets of well-tagged data for each of a supported language leading to these approaches being expensive, time consuming and suffering from quality and bias related issues.

Each of above discussed prevalent approaches are hard to trace, question and comprehend related to how the intent from the user input is determined, how grammar may be adjusted and customized, how training data may be re-tagged to resolve boundary cases, over fit cases and under fit cases. Typically, these approaches identify intents and matches based on correctly constructed fragments and texts. Analysis tends to be either based on machine learning using large sample sets of fragments, which are then mapped to intents, or by using more classical processing in which structure of a sentence is decomposed and analyzed to determine intent, nouns, location and time. These approaches are efficient when access to large training data samples are appropriately tagged with intents and the large training data samples are available in multiple languages.

Though these above mentioned techniques work well for properly-structured words or sentences, however, these NLP models do not work well for poorly-structured and poorly-worded texts, as representative training sets of poor texts are limited and classical language processing that breaks down text as text fragments do not provide structures for these poorly worded and structured texts. In addition, in cases when choice of words is incorrect, and varying dialects having different grammatical structures or words are used, determination of the user's intent is difficult as comparative data is based on correct training data and correct grammar.

Further, use of the available NLP models for understanding the user intent is challenging as Speech-to-Text (STT) processing mechanisms may incorrectly understand certain words and phrases thereby making understanding of the user intent using the NLP model challenging. In addition, machine translations often provide poor translations for the user input. For example, incorrect noun translations in context of a domain or subject and incorrect sentence structures would make it difficult for the intent to be understood by machine learning models based on correct training data and parsing based on grammar for correct text. Additionally, for capturing the user intent in various languages, support for trained and tagged data in different languages may be required. Hence, when the user's intent is incorrectly determined by these approaches, it is hard to understand a reason and to determine a way for resolving a mis-match between the user's actual intent and the derived intent.

Further, non-native level speakers often make errors in grammar or word usage making it difficult for the user intent to be understood by data based on correct training data and correct grammar. As described above, it should be noted that all these approaches and NLP models are language-dependent. Further, using the NLP model and mechanisms for multiple languages requires building parallel processing systems for each language. For example, a Chatbot available for banking, for instance, may understand the user's intent and information based on a specific language or a language dialect of the user. To extend functionality of the Chatbot, a capability to analyze the user input in an additional language may be required and incorporation of support of additional language may require a considerable effort in terms of time and resources to replicate intent processing and understanding in additional languages. Further, non-native speakers often make errors in grammar or word usage making it difficult for the intent to be understood by data based on correct training data and correct grammar.

Therefore, there is a need in the art for improved methods and systems for processing user inputs in multiple languages using a Single Natural Language Processing (SNLP) model thereby accurately identifying intents, purpose, request and sentence parts from the user input while analyzing request and sentence parts of poorly-structured or poorly-worded texts.

SUMMARY

In an embodiment, a method for processing user inputs in multiple languages using a Single Natural Language Processing (SNLP) model is disclosed. In one example, the method may receive, via a communication device, a user input from a user in a source language. The user input may be at least one of a textual input and a verbal input. The method may translate the user input to generate a plurality of translated user inputs in an intermediate language using a machine translation method. A confidence score may be associated with each of the plurality of translated user inputs. Each of the plurality of translated user inputs may be in text form. Further, the method may generate for the plurality of translated user inputs, by the SNLP model configured only using the intermediate language, a plurality of sets of intermediate input vectors in the intermediate language. The method may process the plurality of sets of intermediate input vectors in the intermediate language using at least one of a plurality of predefined mechanisms to identify a predetermined response. Further, the method may translate the predetermined response to generate a translated response. The method may render the translated response to the user.

In another embodiment, a system for processing user inputs in multiple languages using a SNLP model is disclosed. In one example, the system may include a processor, and a memory communicatively coupled to the processor. The memory comprises processor instructions, which when executed by the processor causes the processor to receive, via a communication device, a user input from a user in a source language. The user input may be at least one of a textual input and a verbal input. The processor instructions may translate the user input to generate a plurality of translated user inputs in an intermediate language using a machine translation model. A confidence score may be associated with each of the plurality of translated user inputs. Each of the plurality of translated user inputs may be in text form. Further, the processor instructions, may generate for the plurality of translated user inputs, by the SNLP model configured only using the intermediate language, a plurality of sets of intermediate input vectors in the intermediate language. The processor instructions may process the plurality of sets of intermediate input vectors in the intermediate language using at least one of a plurality of predefined mechanisms to identify a predetermined response. Further, the processor instructions may translate the predetermined response to generate a translated response. The processor instructions may render the translated response to the user.

In yet another embodiment, a computer program product for processing user inputs in multiple languages using a SNLP model is disclosed. In one example, the computer program product is embodied in a non-transitory computer readable storage medium and comprises computer instructions for receiving, via a communication device, a user input from a user in a source language. The user input may be at least one of a textual input and a verbal input. The computer instructions may translate the user input to generate a plurality of translated user inputs in an intermediate language using a machine translation method. A confidence score may be associated with each of the plurality of translated user inputs. Each of the plurality of translated user inputs may be in text form. Further, the computer instructions may generate for the plurality of translated user inputs, by the SNLP model configured only using the intermediate language, a plurality of sets of intermediate input vectors in the intermediate language. The computer instructions may process the plurality of sets of intermediate input vectors in the intermediate language using at least one of a plurality of predefined mechanisms to identify a predetermined response. Further, the computer instructions may translate the predetermined response to generate a translated response. The computer instructions may render the translated response to the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
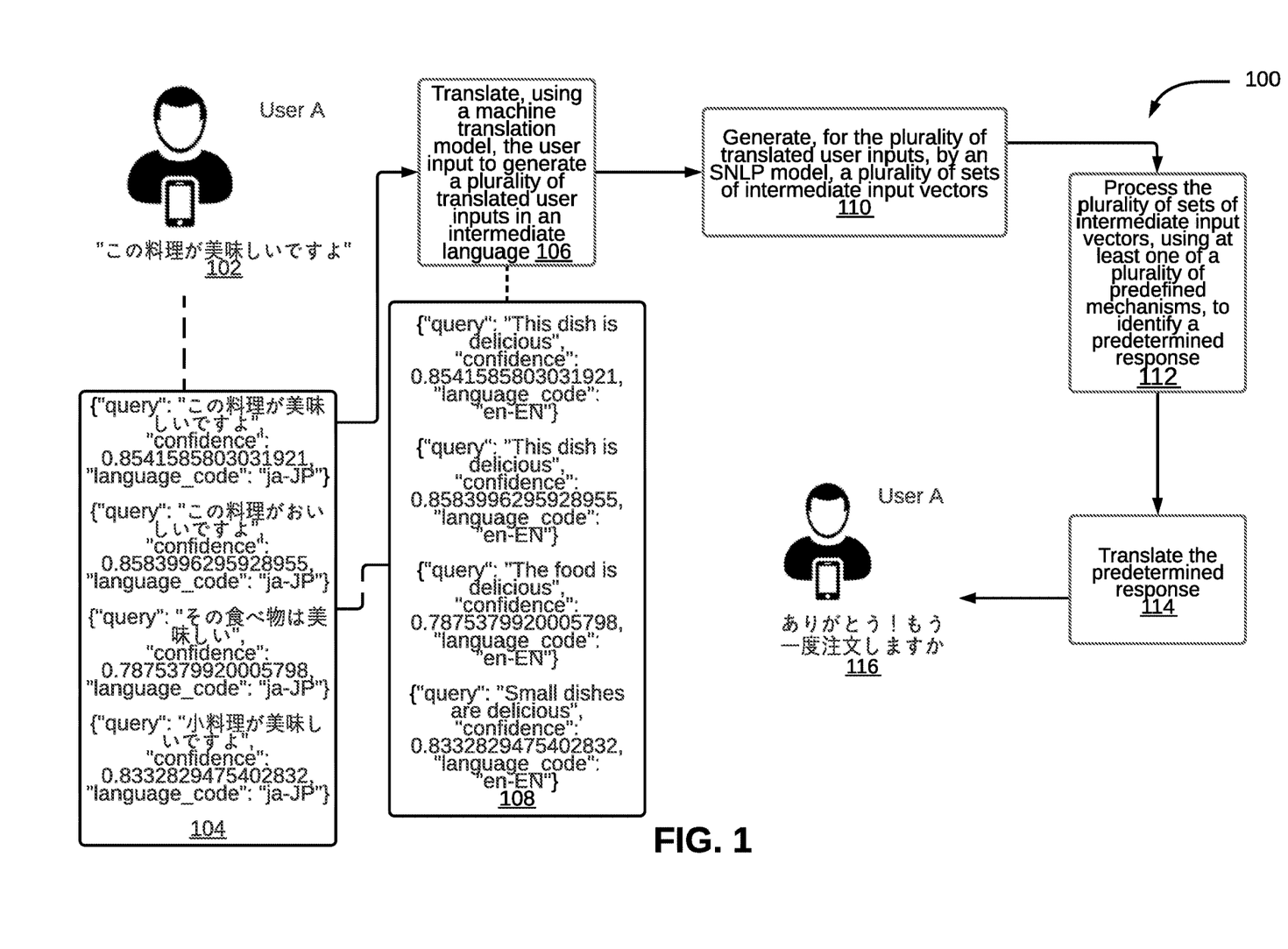
FIG. 1 illustrates an exemplary system for processing multilingual user inputs using Single Natural Language Processing (SNLP) model, in accordance with some embodiments.

Referring now to FIG. 1, an exemplary system 100 for processing multilingual user inputs using Single Natural Language Processing (SNLP) model is illustrated, in accordance with some embodiments. A user input may be received from a user in a source language, at step 102, via a communication device. By way of an example, a user A may be Japanese who may visit another country (non-Japanese speaking) as a tourist and may only be comfortable speaking in Japanese. Thus, in this case, Japanese may be considered as a source language. While having dinner at a hotel the user may wish to compliment a chef for a dish being served. To this end, the user may via a chatbot installed on the computing device provide compliments for the dish. The computing device may be a mobile device such as but limited to a mobile phone, a tablet, a smartwatch, a laptop, or a Personal Digital Assistants (PDA), an application server, and so forth. The user may provide the user input (for example, verbal input) in Japanese, for example, "この料理が美味しいですよ". The user input may not be limited to a query, a command, a request, an action and the like.

In an embodiment, the user input may be at least one of a textual input and a verbal input. The verbal input may be in form of a sentence, a phrase, a word, a phoneme, or a phoneme in context. When the user input is the verbal input, a Speech-to-Text (STT) mechanism may be used, at 104, to convert the verbal input in the source language into a plurality of source textual inputs in the source language. In continuation of the above mentioned example, the received user input "この料理が美味しいですよ" in the source language may be converted to the plurality of source textual inputs in the source language (for example, Japanese language), for example, "この料理が美味しいですよ", "この料理 がおいしいですよ", "その食べ物は 美味しい", "小料理が美味し いですよ", and the like.

Further, each of the plurality of source textual inputs in the source language may be translated to an intermediate language (for example, English language) to generate the plurality of translated user inputs. However, when the user input is the textual input, a machine translation model may be used to translate the received user input to generate a plurality of translated user inputs in the intermediate language at step 106. The machine translation model may include, for example, a rule-based machine translation, a transfer-based machine translation, a neural machine translation, and the like. Each of the plurality of translated user inputs may be in a text form.

With reference to the example above, each of the plurality of translated user inputs may be, for example, "This dish is delicious", "This dish is delicious", "The food is delicious", "Small dishes are delicious", at 108. Further, a confidence score may be associated with each of the plurality of translated user inputs. The confidence score may correspond to at least one of an accuracy of conversion of the verbal input in the source language into a source textual input associated with the translated user input, and an accuracy of the translation of the translated user input in the intermediate language. It may be noted that the machine translation model may result in any or a combination of plurality of properly-structured, properly-worded, poorly-structured and poorly-worded translated user inputs which may limit determination of best matching intents.

In an embodiment, the SNLP model configured only using the intermediate language (for example, English) may be used to generate a plurality of sets of intermediate input vectors in the intermediate language for the plurality of translated user inputs at step 110. The plurality of sets of intermediate input vectors in the intermediate language may be processed, at step 112, using at least one of a plurality of predefined mechanisms to identify a predetermined response. The plurality of predefined mechanisms includes at least one of a statistical mechanism, an artificial intelligence (AI) mechanism, a machine learning (ML) mechanism, and an elastic stretching mechanism. The statistical mechanism utilizes statistical translation models whose parameters stem from analysis of monolingual and bilingual corpora. Further, the ML mechanism allocates rules from text by analyzing a huge set of documents. Using the ML mechanism, a given text is translated from one natural language to another. In addition, the AI mechanism pulls data from different sets of data and analyzes the pulled data to uncover patterns and determine which strategy or action will have the highest probability for success.

Unlike conventional machine translation models, that leverages dictionaries and machine translations for each language to reduce size of a required 'per language training set' required for machine learning and uses multiple NLP processing models, grammar-based natural language parser and/or statistical machine learning model to determine best intent from the user input, the disclosed embodiments, uses a machine translation model to convert the user's text that is prone to poor structure or poor wording in different languages into a single language text. Subsequently, the SNLP model may be used to extract information and identify intent from the translated single language text. The machine translations may result in poorly-structured and poorly-worded texts which may be improved by using an iterative and elastic process that gradually loosens and stretches intent maps of known user text to identify the user's intent.

The identified predetermined response may be translated to generate a translated response, at step 114. The predetermined response may be translated into the source language to generate a translated response. With respect to the example above, the predetermined response "Thanks!! Please come again" is translated into the source language "ありがとう！また来てください". The predetermined response is rendered to the user A at 116.

In an embodiment, a mode to render the predetermined response may vary based on a mode of the user input. For example, if the user input is in form of text, then the response would also be in form of text. In another embodiment, the user may predefine the mode that may be used to render the response, irrespective of the mode in which the user input is received. For example, irrespective of whether the user input is in the form of text or voice, the response would always be vocal.

Figure 2:
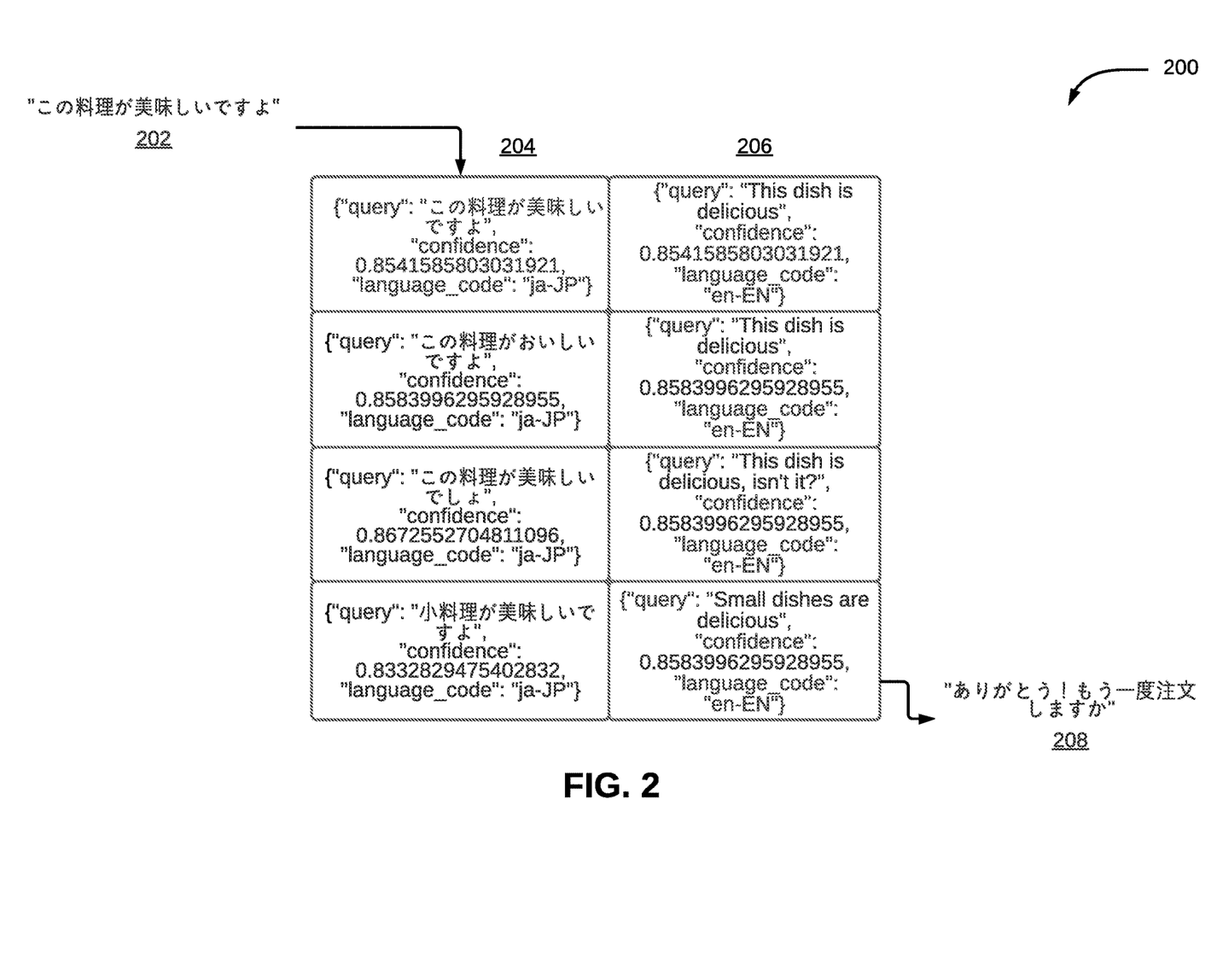
FIG. 2 illustrates an exemplary representation in a tabular form for translating a plurality of source textual inputs in a source language to generate a plurality of translated user inputs in an intermediate language using a machine translation model, in accordance with some embodiments.

Referring now to FIG. 2, an exemplary representation 200 in a tabular form for translating a plurality of source textual inputs in a source language to generate a plurality of translated user inputs in an intermediate language using a machine translation model is illustrated, in accordance with some embodiments.

A verbal user input may be received from a user in a source language and converted into a plurality of source textual inputs in the source language using a Speech-to-Text (STT) mechanism. By way of an example, the received user input in the source language (for example, Japanese language) is "この料理が美味しいですよ" at step 202. The received user input may be converted to the plurality of source textual inputs in the source language, at step 204, using the STT mechanism. Each of the plurality of translated user inputs may have an associated confidence score. The confidence score may be associated with each of the plurality of translated user inputs. In continuation of the example above, the received user input "この料理が美味しいですよ" may be converted to the plurality of source textual inputs, at step 204, and may be represented as:

{"query": "この料理が美味しいですよ",
"confidence": 0.8541585803031921,
"language_code": "ja-JP"}
{"query": "この料理がおいしいですよ",
"confidence": 0.8583996295928955,
"language_code": "ja-JP"}
{"query": "この料理が美味しいでしょ",
"confidence": 0.8672552704811096,
"language_code": "ja-JP"}
{"query": "小料理が美味しいですよ",
"confidence": 0.8332829475402832,
"language_code": "ja-JP"}

A machine translation model may be used to translate the plurality of source textual inputs in the source language to generate a plurality of translated user inputs in an intermediate language (for example, English), at step 206. Each of the plurality of translated user inputs may be in a text form. The machine translation model may include, for example, a rule-based machine translation, a transfer-based machine translation, a neural machine translation, and the like. Further, a confidence score may be associated with each of the plurality of translated user inputs in the intermediate language. In continuation of the example above, the plurality of translated user inputs with the corresponding confidence score may be represented as:

{"query": "This dish is delicious", "confidence": 0.8541585803031921, "language_code": "en-EN"}
{"query": "This dish is delicious", "confidence": 0.8583996295928955, "language_code": "en-EN"}
{"query": "This dish is delicious, isn't it?", "confidence": 0.8583996295928955, "language_code": "en-EN"}
{"query": "Small dishes are delicious", "confidence": 0.8583996295928955, "language_code": "en-EN"}

As may be appreciated, an accurate level of translation for at least the user input to the plurality of source textual inputs in the source language and the plurality of source textual inputs in the source language to generate a plurality of translated user inputs in the intermediate language may fetch higher confidence score, and the confidence score may show a downward trend as the accuracy of the level of translation decreases. A SNLP model configured only using the intermediate language (for example, English) may be used to generate for the plurality of translated user inputs a plurality of sets of intermediate input vectors in the intermediate language.

Subsequently, the plurality of sets of intermediate input vectors in the intermediate language may be processed using at least one of a plurality of predefined mechanisms to identify a predetermined response. The plurality of predefined mechanisms includes at least one of a statistical mechanism, an AI mechanism, and a ML mechanism. The predetermined response may be translated to generate a translated response. The translated response may be rendered to the user at 208.

In another embodiment, when the translated user inputs have poorly-worded text or poorly-worded sentences, an elastic stretching mechanism of the set of predefined mechanisms may be deployed. The elastic stretching mechanism may convert the plurality of sets of intermediate input vectors into corresponding plurality of sets of input intent maps. Further, a plurality of sets of input intent maps, in the intermediate language, may be generated for the plurality of sets of intermediate input vectors. The sets of input intent maps may be, for example, a network of words, a network of concepts, a set of related words, fragments of a sentence, a set of sentences of a known domain and the like. In an embodiment, the sets of input intent maps may also include one or more forms of verb, desire, intent, question, location, and noun. The sets of input intent maps, for example, may be represented or stored as a set of lexeme graphs, a time interval, number of days, a counter, a set of anaphoric references, compound concepts and the like). Each of the plurality of sets of input intent maps may be associated with one of the plurality of translated user inputs.

Referring back to the above-mentioned example, the plurality of sets of input intent maps may be represented as below:

["dish","delicious","taste","flavor"],
["food","yummy","healthy","delicious"],
["dish", "food","delicious","healthy","tasty"],
["dish", "ingredients", "taste"], ['delicious','yummy': 'ADJ', 'is': 'VBZ', 'food','dish':'NN', 'the' DT]

It will be apparent that each set of words within the "[ ]" represents a type of intent map. As discussed before, the plurality of sets of input intent maps may include, but are not limited to a desire, an intent, a question, a location information, a noun, a verb, and similar additional information as determined from the user input. In an embodiment, the elastic stretching mechanism may generate a plurality of sets of input intent maps in the intermediate language for a plurality of sets of intermediate input vectors. Further, each of the plurality of sets of input intent maps may be associated with one of the plurality of translated user inputs. In an embodiment, generation of the plurality of sets of input intent maps includes processing the plurality of sets of intermediate input vectors through at least one of a plurality of intent map transforming algorithms. The intent map transforming algorithms may include at least one of a refinement mechanism, a consolidation mechanism, a synonym mechanism, and a reduction mechanism.

The elastic stretching mechanism may be used to match each of the plurality of sets of input intent maps with each of a plurality of pre-stored sets of intent maps in the intermediate language. Each of the plurality of pre-stored sets of intent maps may be generated from a single predefined training input in the intermediate language and may be mapped to a predefined intent and a predetermined response in the intermediate language. One of the plurality of pre-stored sets of intent maps, for example, may be represented as:

["dish","delicious","taste","flavor"],["food","quality", "comment"],["dish","taste","reply"], ["food","delicious","statement"], ["dish","quality"]

As may be appreciated, the predetermined response may include, for example, canned text, predefined templates, and AI generated responses based on the user's intent and context. In continuation of the example above, each of the plurality of pre-stored sets of intent maps may be mapped to the intent "delicious:food" and the predetermined response of "Thanks!! Please come again.".

In response to matching each of the plurality of sets of input intent maps with each of the plurality of pre-stored sets of intent maps in the intermediate language, a distance of each of the plurality of sets of input intent maps relative to each of the plurality of pre-stored sets of intent maps may be determined, at step 116. The distance may correspond to how close each of the sets of input intent maps is relative to each of the plurality of pre-stored sets of intent maps. The distance, for example, may be a Euclidean distance and may be based on a level of complexity of the sets of input intent maps, a generation mechanism, and the like.

Subsequently, a pre-stored intent map closest (i.e., with a least distance) to the plurality of sets of input intent maps may be identified from the plurality of pre-stored sets of intent maps. In continuation of the example given above, the pre-stored intent map identified from within the plurality of pre-stored sets of intent maps as being closest to the plurality of sets of input intent maps generated for the user comment "This dish is delicious" may be: ["dish","delicious","taste", "flavor"].

The predetermined response mapped to the pre-stored intent map may be translated into the source language to generate a translated response. With reference to the example above, the translated response "ありがとう！もう一度注文しますか" 208 may be rendered to the user. In an embodiment, the set of input intent maps may be processed by an Application Programming Interface (API) corresponding to, but not limited to weather, flight, banking information, and so forth. In such cases the predetermined response may be fetched from the API, and may be related but not limited to, for example, providing a service, performing an action, and generating a real time response.

As may be appreciated, use of at least one of the plurality of intent map transforming algorithms may enable identifying and providing the closest pre-stored intent map while applying a minimum number of transformations to a first subset of words extracted from the plurality of translated user inputs to find a match. This implies that the closest pre-stored intent may be determined by performing a minimum number of transformations involving, for example, stretching and simplifications during an elastic stretching process. In addition, the plurality of sets of input intent maps and the plurality of pre-stored sets of intent maps may be ordered and maintained such that the search for the closest pre-stored intent map involves performing minimal number of transformations thereby extracting relevant content. Further, based on a context dimension, the set of input intent maps and the plurality of pre-stored sets of intent maps may be ordered and maintained such that the search for the closest pre-stored intent map involves performing minimal number of transformations by the elastic stretching process. In an embodiment, the intent map transforming algorithms may be domain specific and may thus further improve accuracy of match between the set of input intent maps and the plurality of pre-stored sets of intent maps. Additionally or alternatively, the generated set of input intent maps may be directed to knowledge sources for resolution. The content dimension, for example, may be based on demographic details of the user, current location of the user, current temperature of the location where the user is present, current transportation being used by the user, time of the day, day of the week, or the current month.

Figure 3:
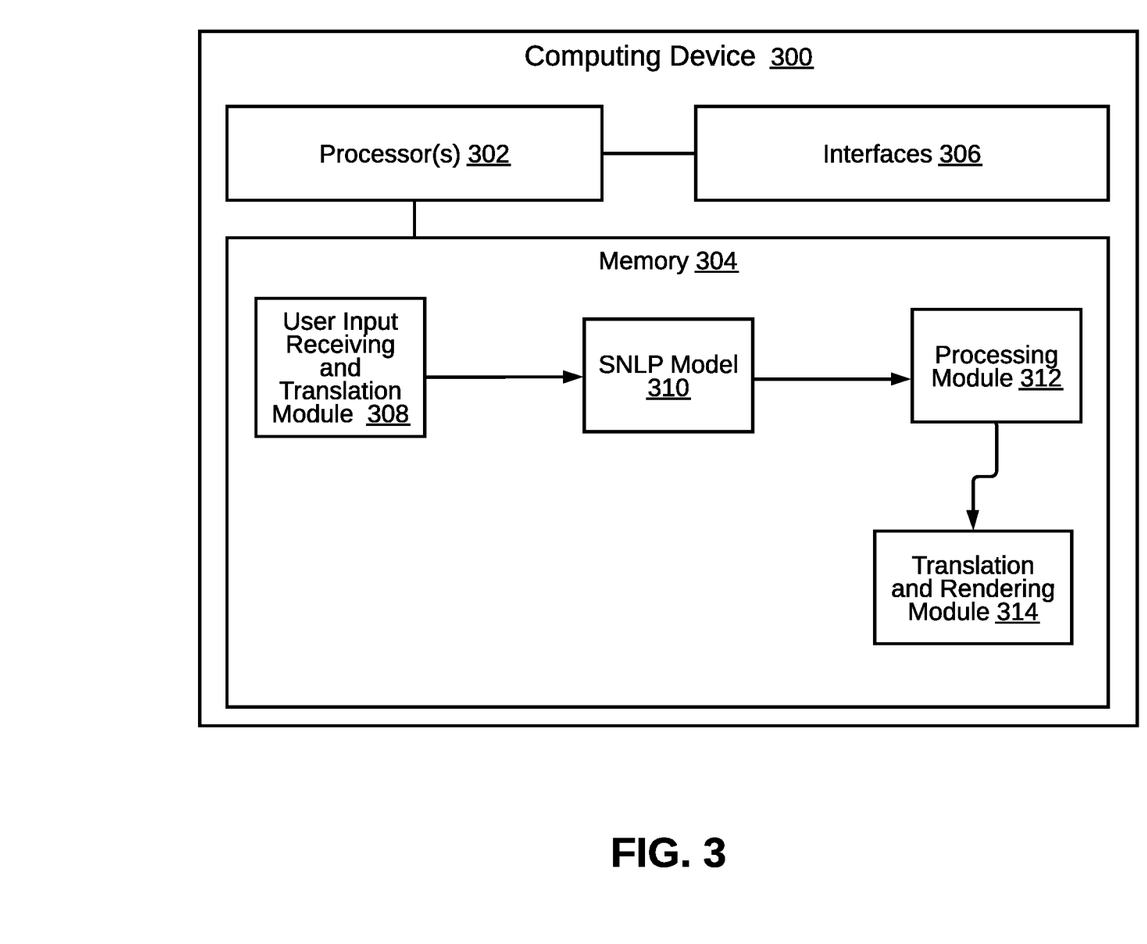
FIG. 3 illustrates a functional block diagram of a computing device implementing an SNPL model for processing multilingual user inputs user inputs, in accordance with some embodiments.

Referring now to FIG. 3, a functional block diagram of a computing device 300 implementing an SNPL model for processing multilingual user inputs is illustrated, in accordance with some embodiments. The computing device 300 may include one or more processors 302, a memory 304, and one or more interfaces 306. The memory 304 may include a user input receiving and translation module 308, a SNLP model 310, a processing module 312, and a translation and rendering module 314.

The one or more processors 302 may be implemented as one or more microprocessors, microcomputers, microcontrollers, digital signal processors, central processing units, logic circuitries, and/or any devices that manipulate data based on operational instructions. Among other capabilities, the one or more processors 302 may be configured to fetch and execute processor-executable instructions stored in the memory 304. The memory 304 may store one or more processor-executable instructions or routines, which may be fetched and executed for processing the user inputs in multiple languages using the SNLP model. The memory 304 may include any non-transitory storage device including, for example, volatile memory such as RAM, or non-volatile memory such as EPROM, flash memory, and the like. The one or more interfaces 306 may include a variety of interfaces, for example, interfaces for data input and output devices, referred to as I/O devices, storage devices, and the like.

In an embodiment, the user input receiving and translation module 308 may receive a user input from a user in a source language via a communication device. The user input may be at least one of a textual input and a verbal input. In case the user input is the verbal input, then the verbal input in the source language may be converted into a plurality of source textual inputs in the source language using a STT mechanism. Each of the plurality of source textual inputs in the source language may be translated to the intermediate language to generate the plurality of translated user inputs. The at least one verbal input from the user may be in form of a sentence, a phrase, a word, a phoneme, or a phoneme in context. However, when the user input is the textual input, a machine translation model may be used to translate the textual user input to generate a plurality of translated user inputs in the intermediate language. Each of the plurality of translated user inputs may be in a text form. Further, a confidence score may be associated with each of the plurality of translated user inputs.

In an embodiment, the SNLP model 310 may be configured only using the intermediate language. The SNLP model may generate for the plurality of translated user inputs, a plurality of sets of intermediate input vectors in the intermediate language. Upon generating the plurality of sets of intermediate input vectors, the processing module 312 may process the plurality of sets of intermediate input vectors in the intermediate language using at least one of a plurality of predefined mechanisms to identify a predetermined response.

The translation and rendering module 314 may translate the predetermined response to generate a translated response. The translated response may be rendered to the user. The rendering may include presenting the predetermined response to the user in form of text or speech. The predetermined response may also be presented in form of an intent map. The translation and rendering module 314 may be implemented as an assistant having, for example, a male voice or a female voice.

It should be noted that all such aforementioned modules 308-316 may be represented as a single module or a combination of different modules. Further, as will be appreciated by those skilled in the art, each of the modules 308-316 may reside, in whole or in parts, on one device or multiple devices in communication with each other. In some embodiments, each of the modules 308-316 may be implemented as dedicated hardware circuit comprising custom application-specific integrated circuit (ASIC) or gate arrays, off-the-shelf semiconductors such as logic chips, transistors, or other discrete components. Each of the modules 308-316 may also be implemented in a programmable hardware device such as a field programmable gate array (FPGA), programmable array logic, programmable logic device, and so forth. Alternatively, each of the modules 308-316 may be implemented in software for execution by various types of processors (e.g., processor(s) 302). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying common requirements from applications. For example, the exemplary computing device 300 may identify common requirements from applications by the processes discussed herein. In particular, as will be appreciated by those of ordinary skill in the art, control logic and/or automated routines for performing the techniques and steps described herein may be implemented by the computing device 300 either by hardware, software, or combinations of hardware and software. For example, suitable code may be accessed and executed by the one or more processors on the computing device 300 to perform some or all of the techniques described herein. Similarly, ASICs configured to perform some or all of the processes described herein may be included in the one or more processors on the computing device 300.

Figure 4:
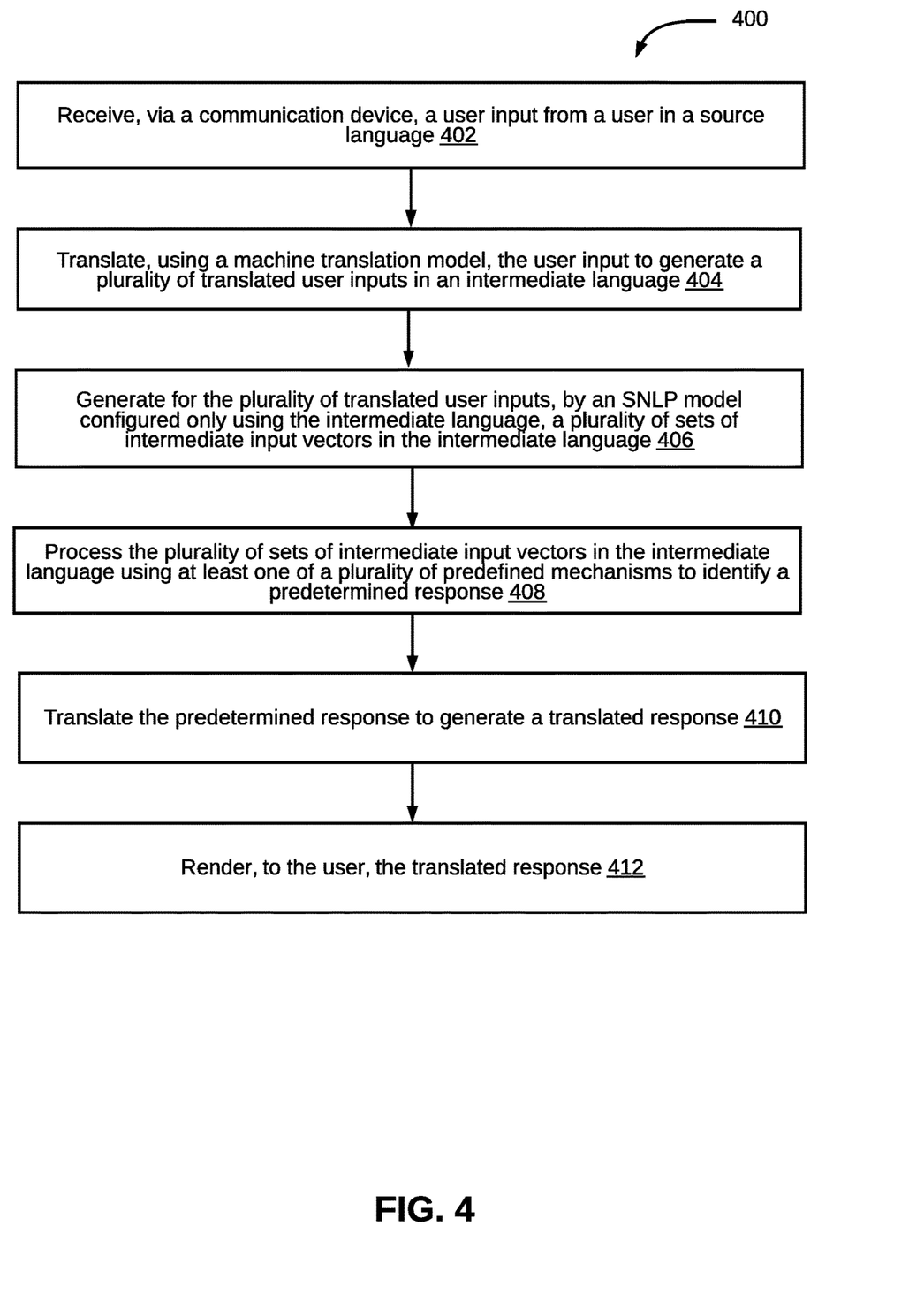
FIG. 4 illustrates an exemplary process for processing user inputs in multiple languages using a SNLP model, in accordance with some embodiments.

Referring now to FIG. 4, an exemplary process 400 for processing user inputs in multiple languages using a SNLP model is illustrated, in accordance with some embodiments. The process 400 includes receiving, via a communication device, a user input from a user in a source language, at step 402. The received user input may be at least one of a textual input and a verbal input. The received user input, for example, may include, but is not limited to a query to execute an action, a request to process through, or a simple action-oriented command. The user may provide the user input using a computing device, which, for example, may be one of a mobile phone, a computer, a PDA, an assistant, and other similar devices. By way of an example, the user input may be a textual input "車とまる" received in a source language (for example, Japanese).

The process 400 uses a machine translation model to translate the user input "車を止める" received as a textual input to generate a plurality of translated user inputs in an intermediate language (for example, English), at step 404. In continuation of the example above, the plurality of translated user inputs may be: "stop the car", "car stops", "stay in the car", "Car and circle", "Get caught in a car", and the like. A confidence score may be associated with each of the plurality of translated user inputs. Further, each of the plurality of translated user inputs may be in text form. The process 400 uses the SNLP model that is configured only using the intermediate language to generate for the plurality of translated user inputs, a plurality of sets of intermediate input vectors in the intermediate language, at step 406. Further, the plurality of sets of intermediate input vectors in the intermediate language may be processed using at least one of a plurality of predefined mechanisms to identify a predetermined response, at step 408. The plurality of predefined mechanisms includes at least one of a statistical mechanism, an AI mechanism, and a ML mechanism.

Further, the predetermined response may be translated into the source language to generate a translated response, at step 410. With reference to the above mentioned example, the predetermined response may be, for example, "車を止める". At step 412, the translated response may be rendered to the user.

Figure 5:
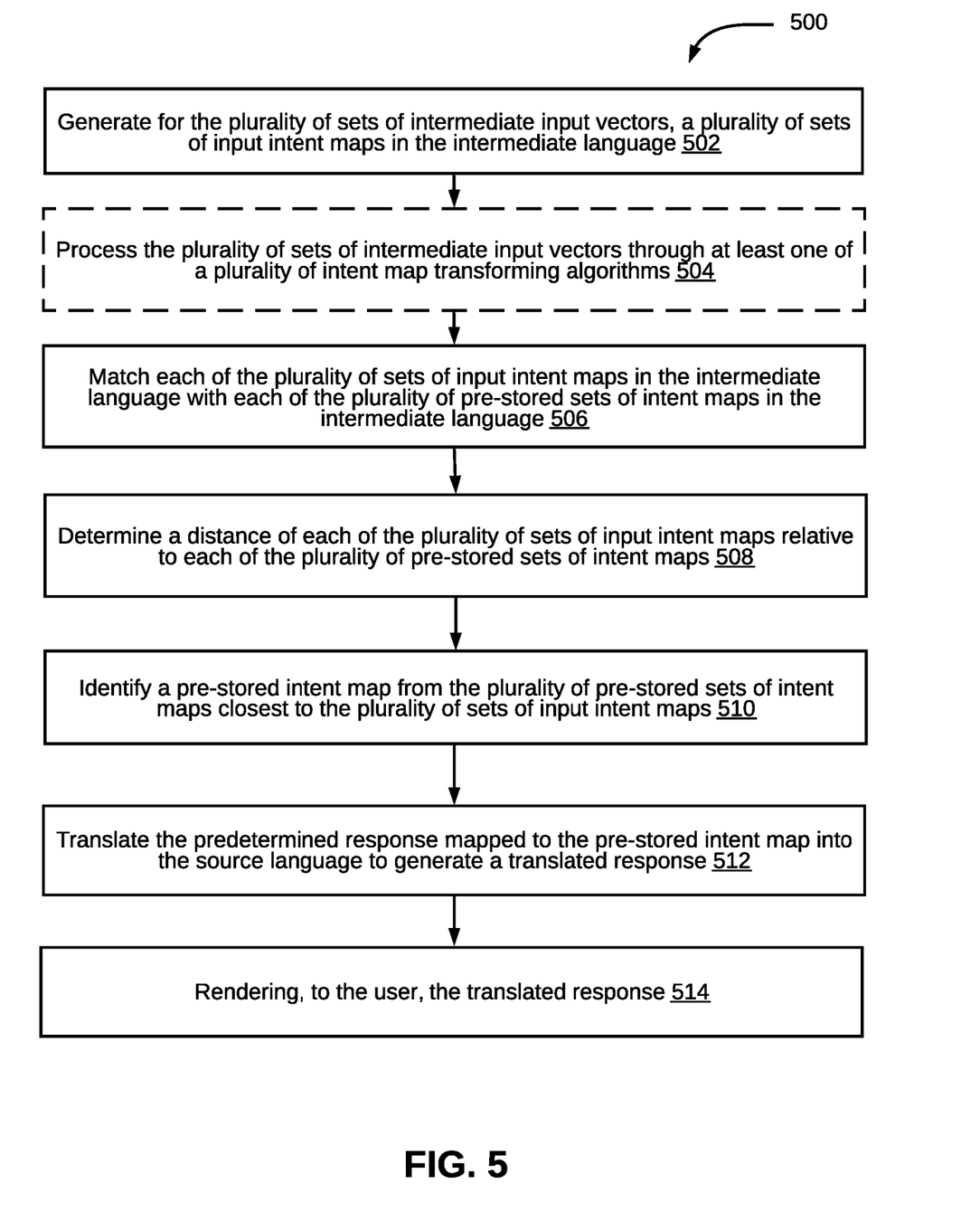
FIG. 5 illustrates an exemplary process for processing intermediate input vectors using an elastic stretching mechanism, in accordance with some embodiments.

Referring now to FIG. 5, an exemplary process 500 for processing intermediate input vectors using an elastic stretching mechanism is illustrated, in accordance with some embodiments. The elastic stretching mechanism of the plurality of predefined mechanisms may generate for the plurality of sets of intermediate input vectors, a plurality of sets of input intent maps in the intermediate language, at step 502. Each of the plurality of sets of input intent maps may be associated with one of the plurality of translated user inputs. In an embodiment, the plurality of sets of input intent maps may be a node network that includes a plurality of nodes. Further, each of the plurality of nodes may be a vector representation of one of the first subset of words extracted from the user input. By way of an example, the set of input intent maps may be represented or stored as lexeme graphs, a time interval, number of days, a counter, a set of anaphoric references, compound concepts, and the like.

With respect to the above mentioned example in FIG. 4, the generated plurality of sets of input intent maps (hereinafter referred as exemplary representation of the plurality of sets of input intent maps) may be represented as:

["start", "action", "perform","car"], ["stop", "halt", "action", "execute","car"], ["stay", "start","push", "action", "perform", "response","car"], ["stay", "action","car"], ["start", "action", "perform", "execute","car"]

Further, the plurality of sets of input intent maps incudes processing the plurality of sets of intermediate input vectors through at least one of a plurality of intent map transforming algorithms, at step 504. The intent map transforming algorithms may include at least one of a refinement mechanism, a consolidation mechanism, a synonym mechanism, and a reduction mechanism.

The process 500, uses the elastic stretching mechanism, to match each of the plurality of sets of input intent maps in the intermediate language with each of a plurality of pre-stored sets of intent maps in the intermediate language, at step 506. It may be noted that each of the plurality of pre-stored sets of intent maps may be generated from a single predefined training input in the intermediate language and may be mapped to a predefined intent and a predetermined response in the intermediate language. By way of an example, the single predefined training input may be "stop the car". Each of the plurality of pre-stored sets of intent maps may further be mapped to the predefined intent, for example, "stop" or "ignite" or "deactivate" and so forth and to the predetermined response, for example, "stopping" or "deactivating" and the like.

With reference to the above-mentioned example, the word "stop" from the single predefined training input in the intermediate language may be used to generate the following alternatives in order to generate each of the plurality of pre-stored sets of intent maps: "stop", "halt", "deactivate", "car", "vehicle".

Using the above, the pre-stored sets of intent maps may be generated from the single predefined training input: "stop the car." The pre-stored sets of intent maps (hereinafter referred as exemplary representation of the pre-stored sets of intent maps) may be represented as:

["stop", "action", "perform","car"], ["stop", "halt", "action", "execute", "car"],
["kickstart", "stop", "push", "action", "perform", "response", "car"],

["open", "action", "perform", "jar"], ["start", "action", "perform", "execute", "far"],
["stop", "request", "car", "action"], ["halt", "open", "stop", "car", "request"],
["run", "deactivate", "car", "vehicle", "request"],
["stop", "halt", "car", "vehicle", 'car']

In continuation of the above-mentioned example, each of the plurality of sets of input intent maps from the aforementioned exemplary representation of the plurality of sets of input intent maps may be matched with each of a plurality of pre-stored sets of intent maps from the aforementioned exemplary representation of the pre-stored sets of intent maps.

The process 500 determines a distance of each of the plurality of sets of input intent maps relative to each of the plurality of pre-stored sets of intent maps, at step 508. Based on the distance determined a pre-stored intent map from the plurality of pre-stored sets of intent maps that is closest to the plurality of sets of input intent maps may be identified. In other words, based on a shortest determined distance or a highest determined level of match, the pre-stored intent map may be identified. The distance may correspond to a level of accuracy of match of each of the plurality of sets of input intent maps with each of a plurality of pre-stored sets of intent maps. As may be appreciated, higher the level of accuracy of the match, the lower may be the distance and vice-versa. Referring back to the above-mentioned example, the distance of each of the plurality of sets of input intent maps relative to each of the pre-stored set of intent maps may be determined.

The process 500, at step 510, may identify a pre-stored intent map from the plurality of pre-stored sets of intent maps closest to the plurality of sets of input intent maps. Referring back to the above-mentioned example, the pre-stored intent map from the plurality of pre-stored sets of intent maps: ["stop","car","action"], may have the least distance to each of the plurality of sets of input intent maps. As a result, the pre-stored intent map: ["stop","car","action"], may be identified. Further, the identified pre-stored intent map may be used to direct user requests and intents to third parties, external systems and processes across multiple languages in which the request may be handled, managed and directed in another service language. Known requests and intents may be mapped or translated to requests in another service languages, using, but not limited to, language based templates, machine translation, third-party language based information sources. Further, the identified pre-stored intent map may be determined by applying an iterative and elastic approach for matching intents from the plurality of pre-stored sets of intent maps.

At step 512, the predetermined response mapped to the pre-stored intent map may be translated into the source language to generate a translated response. At step 514, the translated response may be rendered to the user.

Figure 6:
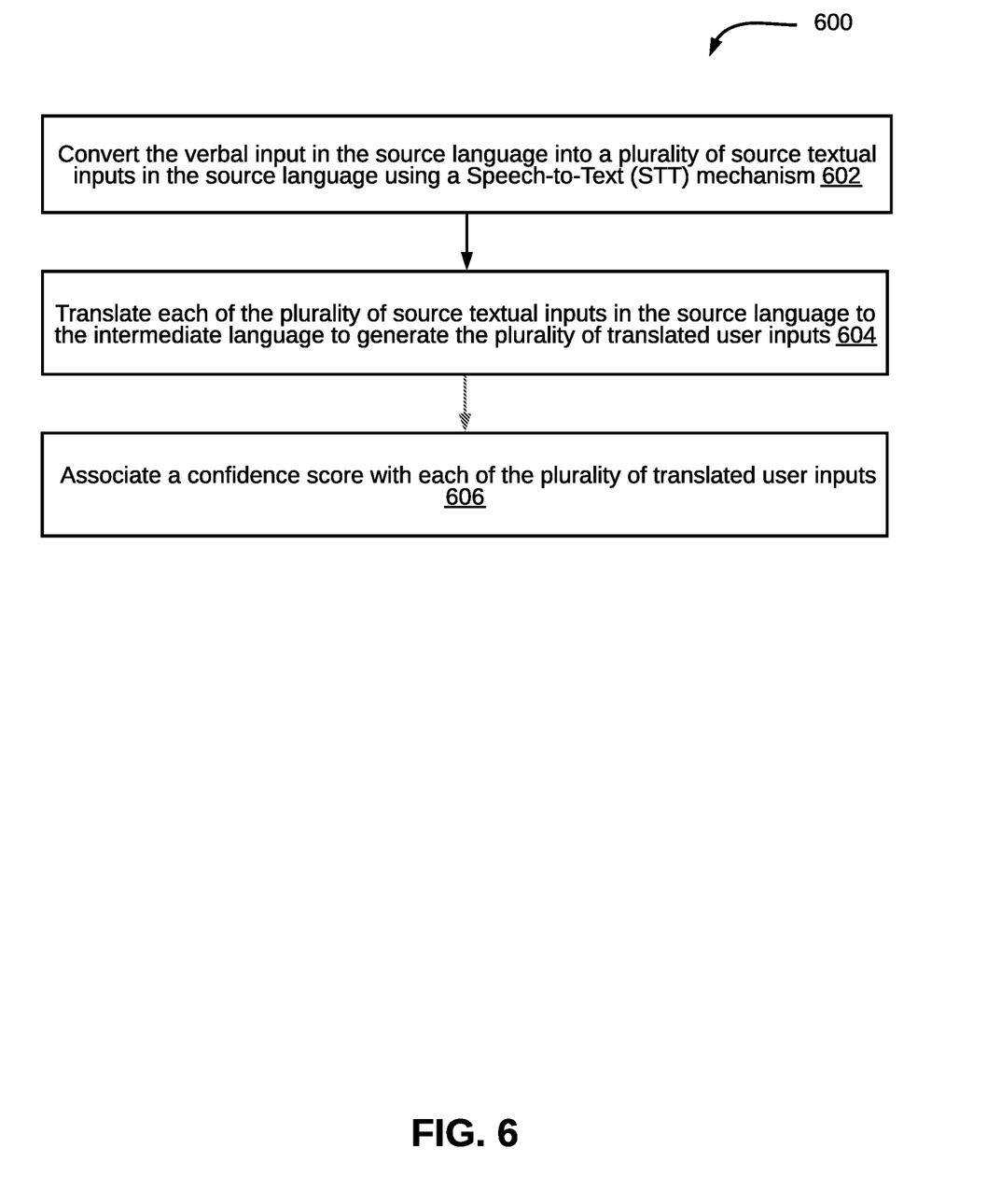
FIG. 6 illustrates an exemplary process for converting the verbal input in the source language into a plurality of source textual inputs in the source language, in accordance with some embodiments.

Referring now to FIG. 6, an exemplary process 600 for converting the verbal input in the source language into a plurality of source textual inputs in the source language is illustrated, in accordance with some embodiments.

In continuation of the example discussed in FIG. 4 and FIG. 5, the user input may be, for example, a verbal input "車を止める" received in a source language (for example, Japanese). The process 600, at step 602 may convert the verbal input received from the user in the source language into a plurality of source textual inputs in the source language using a STT mechanism. For example, the converted the verbal input into the plurality of source textual inputs may be represented as: {"車止まる"}, {"車止まる"}, {"車泊まる"}, {"車と丸"}, {"車とまれる"}, and the like.

Further, at step 604, the plurality of source textual inputs in the source language may be translated to the intermediate language (for example, English) to generate the plurality of translated user inputs. In continuation of the example above, the translated plurality of source textual inputs in the intermediate language may be represented as: {"stop the car"}, {"Car stops"}, {"Stay in the car"}, {"Car and circle"}, {"Get caught in a car"}, and the like.

The process 600, at step 606 may associate a confidence score with each of the plurality of translated user inputs. The confidence score may correspond to at least one of accuracy of conversion of the verbal input in the source language into a source textual input associated with the translated user input, and accuracy of the translation of the translated user input in the intermediate language. In continuation of the above mentioned example, a unique confidence score may be associated with each of the translated user input from the plurality of translated user inputs and may be represented as, for example, {"stop the car", "confidence": ": 0.9386606216430664}, {"Car stops", "confidence": 0.8924497365951538}, {"Stay in the car", "confidence": 0.7090346813201904}, {"Car and circle", "confidence": 0.7010346813201904}, {"Get caught in a car", "confidence": 0.691829475402832}.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Thus, the disclosed method and system try to overcome the problem of creating and using multiple huge examples sets, training sets or tagging sets for each of multiple languages for determining an intent from the user input, a ML approach with training or configuration based on poor examples and an NLP approach in which the grammar includes rules and structure for poor examples and a statistical approach based on poor examples. The disclosed system and method may use the SNLP model to process and understand user intents and information for chatbots that may be used for personal use, as personal assistants and cross language assistants, for businesses as well as for entertainment purposes. The disclosed method and system may provide the SNLP model to process and understand user intents and information received in multiple languages. A machine translation mechanism may be used to convert the user input in multiple languages into a single language for further interpretation, intent and information extraction. The disclosed system and method may use an intent map transforming algorithm (i.e., iterative and elastic process) to gradually loosen and stretch intent maps of known text and user text to identify the user intent and a ML approach with training or configuration based on poor examples and an NLP approach in which the grammar includes rules and structure for poor example and a statistical approach based on poor examples. As only one NLP process (i.e., SNLP model) is required for each language, the disclosed system and method may reduce costs and efforts associated with managing grammar, statistical methods, machine learning training data sets. The disclosed system and method may reduce costs and efforts that are associated with managing multiple language intent process, goal process, information retrieval and processing, action and resource accessing as only one set of intents, goals, information, access and resource interfacing and API is required. The disclosed system and method may provide a better understanding of intents, purpose and sentence parts of poorly-structured and poorly-worded texts. our stretching approach will be enhanced by improvements in translation and STT. The disclosed system and method may provide an elastic stretching mechanism for tracing and understanding and therefore adapting when the SNLP needs to be adjusted. The disclosed system and method may provide a better understanding of intent of non-native speakers. The disclosed system and method may provide better understanding of the intent from text obtained through machine translation, which may be prone to poor structure or poor wording.

As will be appreciated by those skilled in the art, the techniques described in the various embodiments discussed above are not routine, or conventional, or well understood in the art. The techniques discussed above may provide receiving, via a communication device, a user input from a user in a source language. The user input may be least one of a textual input and a verbal input. The technique may translate the user input, using a machine translation model, to generate a plurality of translated user inputs in an intermediate language. A confidence score may be associated with each of the plurality of translated user inputs. Each of the plurality of translated user inputs may be in text form. The technique may generate for the plurality of translated user inputs a plurality of sets of intermediate input vectors in the intermediate language using the SNLP model configured only using the intermediate language. The technique may process the plurality of sets of intermediate input vectors in the intermediate language using at least one of a plurality of predefined mechanisms to identify a predetermined response. The technique may translate the predetermined response to generate a translated response. The translated response may be rendered to the user.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for processing multilingual user inputs using a SNLP model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for processing user inputs in multiple languages using a Single Natural Language Processing (SNLP) model, the method comprising: receiving, via a communication device, a user input from a user in a source language, wherein the user input is at least one of a textual input and a verbal input; translating, using a machine translation model, the user input to generate a plurality of translated user inputs in an intermediate language, wherein a confidence score is associated with each of the plurality of translated user inputs, and wherein each of the plurality of translated user inputs is in text form; generating for the plurality of translated user inputs, by the SNLP model configured only using the intermediate language, a plurality of sets of intermediate input vectors in the intermediate language; processing the plurality of sets of intermediate input vectors in the intermediate language using at least one of a plurality of predefined mechanisms to identify a predetermined response, wherein the set of predefined mechanisms further comprises an elastic stretching mechanism, and wherein the elastic stretching mechanism comprises: generating for the plurality of sets of intermediate input vectors, a plurality of sets of input intent maps in the intermediate language, wherein each of the plurality of sets of input intent maps is associated with one of the plurality of translated user inputs; matching each of the plurality of sets of input intent maps in the intermediate language with each of a plurality of pre-stored sets of intent maps in the intermediate language, wherein each of the plurality of pre-stored sets of intent maps is generated from a single predefined training input in the intermediate language and is mapped to a predefined intent and a predetermined response in the intermediate language; determining a distance of each of the plurality of sets of input intent maps relative to each of the plurality of pre-stored sets of intent maps; identifying a pre-stored intent map from the plurality of pre-stored sets of intent maps closest to the plurality of sets of input intent maps; translating the predetermined response mapped to the pre-stored intent map into the source language to generate a translated response; and rendering, to the user, the translated response.

2. The method of claim 1, wherein the plurality of predefined mechanisms comprises at least one of a statistical mechanism, an artificial intelligence (AI) mechanism, and a machine learning (ML) mechanism.

3. The method of claim 1, further comprising: generating the plurality of sets of input intent maps based on the plurality of sets of intermediate input vectors, wherein generating the plurality of sets of input intent maps comprises processing the plurality of sets of intermediate input vectors through at least one of a plurality of intent map transforming algorithms.

4. The method of claim 1, further comprising: converting the verbal input in the source language into a plurality of source textual inputs in the source language using a Speech-to-Text (STT) mechanism.

5. The method of claim 4, wherein each of the plurality of source textual inputs in the source language is translated to the intermediate language to generate the plurality of translated user inputs.

6. The method of claim 4, wherein the confidence score associated with a translated user input from the plurality of translated user inputs corresponds to at least one of:
accuracy of conversion of the verbal input in the source language into a source textual input associated with the translated user input; and
accuracy of the translation of the translated user input in the intermediate language.

7. The method of claim 1, wherein the at least one verbal input from the user is in form of a sentence, a phrase, a word, or a phoneme in context.

8. A system for processing multilingual user inputs using a Single Natural Language Processing (SNLP) model, the system comprising: a processor; and a memory communicatively coupled to the processor, wherein the memory stores processor-executable instructions, which, on execution, causes the processor to: receive, via a communication device, a user input from a user in a source language, wherein the user input is at least one of a textual input and a verbal input; translate, using a machine translation model, the user input to generate a plurality of translated user inputs in an intermediate language, wherein a confidence score is associated with each of the plurality of translated user inputs, and wherein each of the plurality of translated user inputs is in text form; generate for the plurality of translated user inputs, by the SNLP model configured only using the intermediate language, a plurality of sets of intermediate input vectors in the intermediate language; process the plurality of sets of intermediate input vectors in the intermediate language using at least one of a plurality of predefined mechanisms to identify a predetermined response, wherein the set of predefined mechanisms further comprises an elastic stretching mechanism, and wherein the elastic stretching mechanism comprises: generating for the plurality of sets of intermediate input vectors, a plurality of sets of input intent maps in the intermediate language, wherein each of the plurality of sets of input intent maps is associated with one of the plurality of translated user inputs; matching each of the plurality of sets of input intent maps in the intermediate language with each of a plurality of pre-stored sets of intent maps in the intermediate language, wherein each of the plurality of pre-stored sets of intent maps is generated from a single predefined training input in the intermediate language and is mapped to a predefined intent and a predetermined response in the intermediate language; determining a distance of each of the plurality of sets of input intent maps relative to each of the plurality of pre-stored sets of intent maps; identifying a pre-stored intent map from the plurality of pre-stored sets of intent maps closest to the plurality of sets of input intent maps; translating the predetermined response mapped to the pre-stored intent map into the source language to generate a translated response; and rendering, to the user, the translated response.

9. The system of claim 8, wherein the plurality of predefined mechanisms comprises at least one of a statistical mechanism, an artificial intelligence (AI) mechanism, and a machine learning (ML) mechanism.

10. The system of claim 8, wherein the processor-executable instructions further cause the processor to: generate the plurality of sets of input intent maps based on the plurality of sets of intermediate input vectors, wherein generating the plurality of sets of input intent maps comprises processing the plurality of sets of intermediate input vectors through at least one of a plurality of intent map transforming algorithms.

11. The system of claim 8, wherein the processor-executable instructions further comprise converting the verbal input in the source language into a plurality of source textual inputs in the source language using a Speech-to-Text (STT) mechanism.

12. The system of claim 11, wherein each of the plurality of source textual inputs in the source language is translated to the intermediate language to generate the plurality of translated user inputs.

13. The system of claim 11, wherein the confidence score associated with a translated user input from the plurality of translated user inputs corresponds to at least one of:
accuracy of conversion of the verbal input in the source language into a source textual input associated with the translated user input; and
accuracy of the translation of the translated user input in the intermediate language.

14. The system of claim 8, wherein the at least one verbal input from the user is in form of a sentence, a phrase, a word, or a phoneme in context.

15. A computer program product being embodied in a non-transitory computer readable storage medium of a computing device and comprising computer instructions for processing multilingual user inputs using a Single Natural Language Processing (SNLP) model, the computer program product comprising: receiving, via a communication device, a user input from a user in a source language, wherein the user input is at least one of a textual input and a verbal input; translating, using a machine translation model, the user input to generate a plurality of translated user inputs in an intermediate language, wherein a confidence score is associated with each of the plurality of translated user inputs, and wherein each of the plurality of translated user inputs is in text form; generating for the plurality of translated user inputs, by the SNLP model configured only using the intermediate language, a plurality of sets of intermediate input vectors in the intermediate language; processing the plurality of sets of intermediate input vectors in the intermediate language using at least one of a plurality of predefined mechanisms to identify a predetermined response, wherein the set of predefined mechanisms further comprises an elastic stretching mechanism, and wherein the elastic stretching mechanism comprises: generating for the plurality of sets of intermediate input vectors, a plurality of sets of input intent maps in the intermediate language, wherein each of the plurality of sets of input intent maps is associated with one of the plurality of translated user inputs; matching each of the plurality of sets of input intent maps in the intermediate language with each of a plurality of pre-stored sets of intent maps in the intermediate language, wherein each of the plurality of pre-stored sets of intent maps is generated from a single predefined training input in the intermediate language and is mapped to a predefined intent and a predetermined response in the intermediate language; determining a distance of each of the plurality of sets of input intent maps relative to each of the plurality of pre-stored sets of intent maps; identifying a pre-stored intent map from the plurality of pre-stored sets of intent maps closest to the plurality of sets of input intent maps; translating the predetermined response mapped to the pre-stored intent map into the source language to generate a translated response; and rendering, to the user, the translated response.

16. The computer program product of claim 15, wherein the plurality of predefined mechanisms comprises at least one of a statistical mechanism, an artificial intelligence (AI) mechanism, and a machine learning (ML) mechanism.

17. The computer program product of claim 15, further comprising: generating the plurality of sets of input intent maps based on the plurality of sets of intermediate input vectors, wherein generating the plurality of sets of input intent maps comprises processing the plurality of sets of intermediate input vectors through at least one of a plurality of intent map transforming algorithms.

* * * * *